United States Patent [19]
Cameron

[11] Patent Number: 5,603,839
[45] Date of Patent: Feb. 18, 1997

[54] PROCESS FOR THE RECOVERY OF WASTE SULPHURIC ACID

[75] Inventor: Gordon M. Cameron, Willowdale, Canada

[73] Assignee: Cecebe Technologies Inc., Willowdale, Canada

[21] Appl. No.: 529,771

[22] Filed: Sep. 18, 1995

[51] Int. Cl.⁶ .................................................. C02F 1/42
[52] U.S. Cl. .................. 210/665; 210/668; 210/669; 210/673; 210/683; 423/531; 159/47.3
[58] Field of Search .......................... 423/531; 159/47.3; 210/663, 664, 669, 668, 684, 670, 673, 678, 665, 683; 204/DIG. 13

[56] References Cited

U.S. PATENT DOCUMENTS

| | | | |
|---|---|---|---|
| 2,098,056 | 11/1937 | McBerty | 423/531 |
| 2,185,095 | 12/1939 | Smith et al. | 423/531 |
| 2,662,812 | 12/1953 | Shaw | 423/531 |
| 2,946,659 | 7/1960 | Francis | 423/531 |
| 3,001,854 | 9/1961 | Kenworthy | 423/531 |
| 3,067,007 | 12/1962 | Hatch et al. | 423/105 |
| 3,306,702 | 2/1967 | Odland et al. | 423/531 |
| 3,388,058 | 6/1968 | Wirth, Jr. | 210/688 |
| 3,388,059 | 6/1968 | Wirth, Jr. | 210/688 |
| 3,689,217 | 9/1972 | Capaul et al. | 423/531 |
| 3,713,786 | 1/1973 | Umstead | 423/531 |
| 3,725,259 | 4/1973 | Depree | 210/684 |
| 3,743,484 | 7/1973 | Morimoto | 423/531 |
| 3,919,388 | 11/1975 | Thompson et al. | 423/69 |
| 3,992,247 | 11/1976 | Bodenbenner et al. | 423/531 |
| 4,043,804 | 8/1977 | Lindblad | 75/117 |
| 4,125,596 | 11/1978 | Ryabenko et al. | 423/531 |
| 4,559,216 | 12/1985 | Nagai et al. | 423/531 |
| 4,952,387 | 8/1990 | Lailach et al. | 423/531 |
| 5,051,187 | 9/1991 | Matsumoto et al. | 210/639 |
| 5,061,472 | 10/1991 | Lailach et al. | 423/531 |
| 5,228,885 | 7/1993 | Wagner et al. | 423/531 |
| 5,275,701 | 1/1994 | Mazzafro et al. | 423/531 |

Primary Examiner—Cynthia L. Nessler
Attorney, Agent, or Firm—Bereskin & Parr; Philip Mendes da Costa

[57] ABSTRACT

A process for concentrating a waste sulphuric acid stream containing metal sulphates including iron sulphate comprises the steps of subjecting the stream to an ion exchange operation to produce an acid-rich stream and a salt-rich stream and, concentrating the acid-rich stream to produce a concentrated sulphuric acid stream.

21 Claims, 2 Drawing Sheets

PROCESS FOR THE RECOVERY OF WASTE SULPHURIC ACID

FIELD OF THE INVENTION

This invention relates to a process for treating waste sulphuric acid which contains metal sulphates including iron sulphate. In particular, the invention relates to a process for efficiently recovering sulphuric acid for reuse from a waste sulphuric acid stream containing iron sulphate.

BACKGROUND TO THE INVENTION

Waste sulphuric acid streams are generated in many industrial operations including the leaching of ores, such as titanium dioxide, the scrubbing of furnace gases in smelters, tail gas scrubbing in power plants, the pickling of metals such as steel and many other similar operations. Until recently, many of these streams were discharged to the environment such as by discharging them to oceans or rivers, or the streams were neutralized by the addition lime to form large piles of heavily contaminated gypsum. These waste streams typically comprise large volumes of material. For example, in the case of a sulphate process titanium pigment operation, from about 200 to about 300 tons per day of waste acid may have to be processed. In the case of a drying or pickling operation, from about 5 to about 10 tons per day of waste acid may have to be processed. The discharge of such large amounts of waste acid to the environment is no longer acceptable or, in some cases, permitted. Further, due to landfill costs, disposal of the neutralized effluent is undesirable.

One alternative approach comprises subjecting the waste acid stream to a pre-concentration step and subsequently, after filtration, passing the stream through a crystallization unit to produce a processed waste acid stream containing iron sulphate heptahydrate. After the iron sulphate heptahydrate is removed, the processed waste acid stream is then concentrated.

One disadvantage with this process is that the iron sulphate is removed as iron sulphate heptahydrate. Iron sulphate heptahydrate is a gelatinous precipitate which tends to plug or foul process equipment. Accordingly, the production of this precipitate requires special handling techniques and more frequent, time consuming cleaning of the process equipment.

A further disadvantage of this process is that all metal sulphates do not crystallize out at the same rate. Some will concentrate in the liquor phase. Accordingly, additional process steps are required if the waste acid is to be recycled.

An alternate process comprises passing the waste acid streams to a pre-concentration step and then subjecting the concentrated waste acid to a spray drying process. The spray drying process results in the production of vaporized sulphuric acid and water with the dissolved salts being removed as a dry powder. The vaporized water and sulphuric acid are subjected to a partial condensation step to produce conventional strength acid. A disadvantage with this process is that the dry solids are very hygroscopic and corrosive when wet. A further disadvantage is that spray drying equipment has a high capital cost. In addition, due to the substantial energy input which is required to vaporize the entire waste acid stream, the operating costs of the spray drying operation are relatively high.

SUMMARY OF THE INVENTION

In accordance with the instant invention, a process for concentrating a waste sulphuric acid stream containing metal sulphates including iron sulphate comprises the steps of subjecting the stream to an ion exchange operation to produce an acid-rich stream and a salt-rich stream, the ion exchange operation being conducted to produce an acid-rich stream having an acid concentration above the concentration at which iron sulphate precipitates out as iron sulphate heptahydrate and concentrating the acid-rich stream to produce a concentrated sulphuric acid stream whereby, during these steps, the iron sulphate which precipitates out is in its monohydrate form. The concentration of acid in the waste acid stream may be up to about 50% acid on a weight basis. Unless otherwise stated, all concentrations are expressed on a weight basis.

The are various sources for the waste acid stream including waste acid from titanium pigment operations, scrubber liquors from incineration of alkylation and similar waste acids, pickle liquor from steel pickling operations and scrubber effluent from metallurgical or other scrubbing operations. The concentration of the waste acid will vary depending upon the process from which the waste acid is obtained. By way of example, if the waste acid is produced in a digestion or leaching process, then the concentration of acid in the waste acid may be from about 15 to about 50% on a weight basis. If the process is a leaching process for titanium ores, then the concentration of acid may be from about 20 to about 30%. If the source of waste acid is the liquid effluent from a gas scrubbing process, such as may be obtained in a smelter or power plant scrubbing system, then the concentration of acid may be from about 5 to about 10%. Accordingly, the concentration of acid in the waste sulphuric acid stream may be up to about 50%, more preferably from about 10 to about 50%, and most preferably from about 15 to about 30%.

The concentration of metal sulphates in the waste sulphuric acid stream which is subjected to the iron exchange operation is preferably less than the solubility limit of metal sulphates in the concentrated stream. The metal sulphate concentration in the waste sulphuric acid stream may vary from about 100 ppm to about 10 wt %.

If the waste acid stream is relatively dilute, then the waste sulphuric acid stream is preferably subjected to a pre-concentration step to produce a concentrated waste acid stream. The concentrated waste acid stream may then be fed to the ion exchange step. The waste acid stream is preferably concentrated so that the acid concentration in the concentrated stream is less than about 50 wt %. Typical ion exchange resins can tolerate acid strengths up to about 50 wt % without rapid degradation. The waste acid stream is also preferably concentrated so that the concentration of metal sulphates in the concentrated stream is sufficiently low so that the sulphates will not precipitate out in the ion exchanger or any equipment upstream therefrom.

The process is very flexible and may be adjusted to produce a variety of acid-rich streams having differing acid and dissolved salts (sulphates) concentrations. If the process is used in a titanium pigment operation, then it may be desired to reuse the product acid in the leaching operation. Accordingly, the strength of the product acid and its dissolved and suspended solids content is not very critical. Alternately, the product acid may be used as a diluent for further acid manufacture. In such a case, the product acid preferably has a dissolved salts concentration less than about 50 ppm and an acid concentration greater than about 50 %.

The acid-rich stream may be concentrated to contain more than about 60% sulphuric acid. If desired, the acid-rich stream may be treated so as to have a concentration of up to about 95%. The degree of concentration will vary depending upon the treatment steps which are utilized. For example, if a multiple effect process is utilized, then the acid-rich stream may be concentrated to have an acid concentration of up to about 75%. The use of evaporation to further increase the acid concentration beyond this level is generally not desirable due to the high operating temperatures and vacuums which must be utilized.

The acid-rich stream will contain a minor amount of metal sulphates. The exact concentration of metal sulphates in the acid-rich stream will depend upon the efficiency of the ion exchange process and the initial concentration of metal sulphates in the waste acid stream. The concentration of metal sulphates in the acid-rich stream may vary from about 5 ppm to about 2 wt %. As the acid-rich stream is concentrated, the concentration of the metal sulphates will correspondingly increase. As the acid-rich stream is concentrated, the concentration of metal sulphates may exceed the solubility level of metal sulphates in the concentrated stream. If this occurs, then the metal sulphates will precipitate out of solution. However, since this precipitation occurs at a high acid concentration level, above about 60% and, more preferably above about 70%, the metal sulphates will form a monohydrate precipitate which is easily handled. In particular, by condutcing the ion exchange step and maintaining the concentration of metal sulphates below their solubility level until the concentration of the acid exceeds about 60%, the production of ion sulphate heptahydrate may be avoided.

The strength of the sulphuric acid could be further enhanced by the addition of a stronger acid stream (e.g. from about 90 to about 98% acid), oleum or sulphur trioxide. In one embodiment, one or more of these compounds could be added to result in the production of dirty acid (about 93% sulphuric acid). Such acid may be used in leaching operations, such as in copper refining. Alternately, a sufficient amount of one or more of these compounds could be added to produce sulphuric acid having an acid concentration of about 98% or more. Sulphuric acid streams of such concentration have various uses including use in absorption columns.

Surprisingly, the instant process provides an energy efficient process to produce a concentrated sulphuric acid stream from waste sulphuric acid without the formation of undesirable precipitates such as iron sulphate heptahydrate. By using the process of the instant invention, waste acid streams containing a wide range of inlet acid concentrations may be used to produce sulphuric acid streams of varying concentration, i.e. from recycle streams to dirty acid streams to highly concentrated sulphuric acid.

BRIEF DESCRIPTION OF THE DRAWINGS

These and other advantages of the instant invention will be more fully and completely understood by reference to the following drawings of a preferred embodiment of the invention in which.

DESCRIPTION OF THE PREFERRED EMBODIMENT

Figure 1:
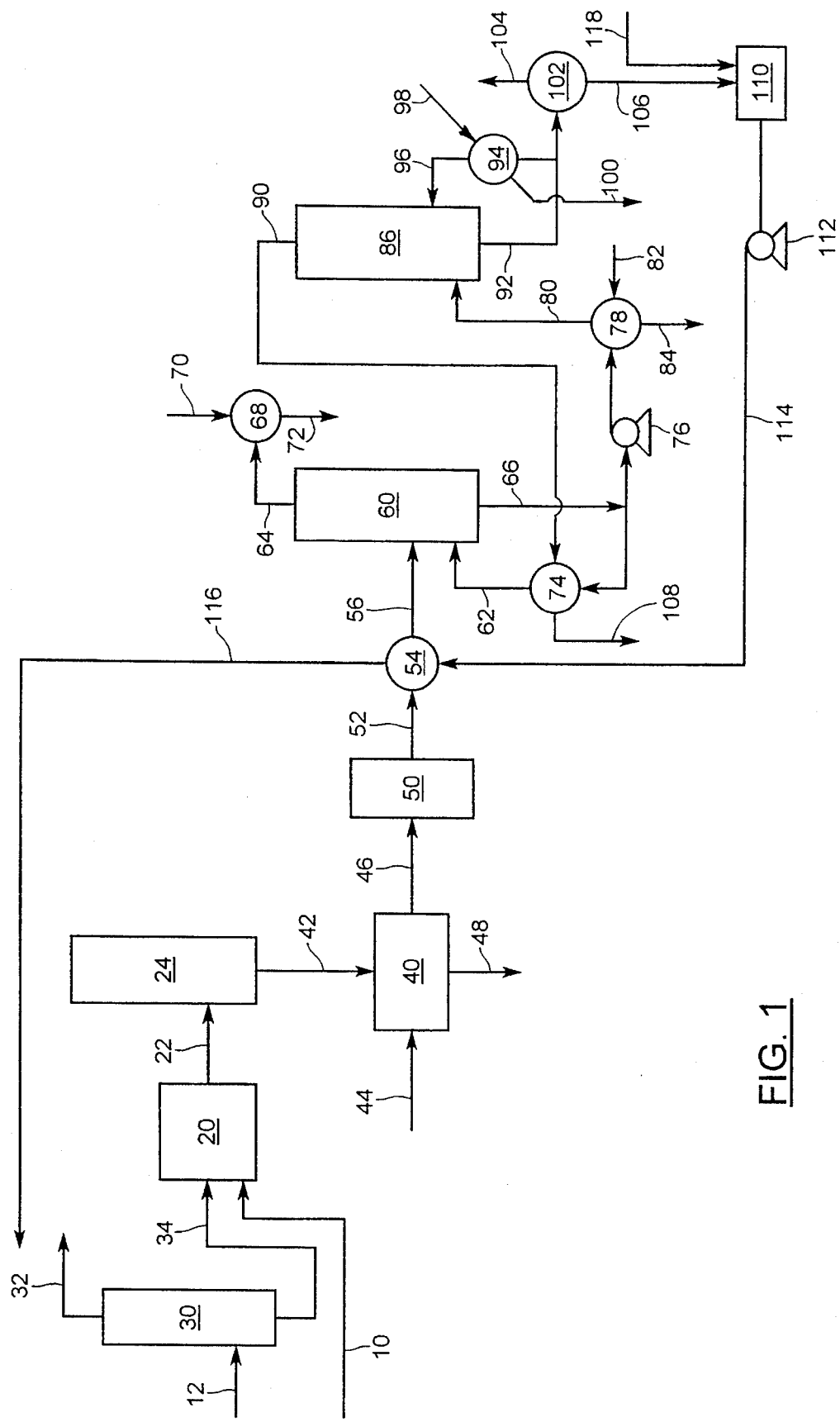
FIG. 1 is a schematic view of the process according to the instant invention.

The instant process relates to a treatment of a waste acid stream 10 which contains metal sulphates including iron sulphate. The waste acid stream may be produced in various industrial operations including the leaching of ores, the scrubbing of furnace gases in smelters, the scrubbing of tail gases in power plants and the pickling of metals such as steel. Typically, these waste acid streams contain a variety of contaminants including iron sulphate. Preferably, the waste acid stream is a waste sulphuric acid stream.

The acid concentration of waste acid stream 10 may vary substantially depending upon the process from which the stream is obtained. The are various sources for the waste acid stream including waste acid from titanium pigment operations, scrubber liquors from incineration of alkylation and similar waste acids, pickle liquor from steel pickling operations and scrubber effluent from metallurgical or other scrubbing operations. The concentration of the waste acid will vary depending upon the process from which the waste acid is obtained. By way of example, if the waste acid is produced in a digestion or leaching process, then the concentration of acid in the waste acid may be from about 15 to about 50% on a weight basis. If the process is a leaching process for titanium ores, then the concentration of acid may be from about 20 to about 30%. If the source of waste acid is the liquid effluent from a gas scrubbing process, such as may be obtained in a smelter or power plant scrubbing system, then the concentration of acid may be from about 5 to about 10%. Accordingly, the concentration of acid in the waste sulphuric acid stream may be up to about 50%, more preferably from about 10 to about 50%, and most preferably from about 15 to about 30%.

The concentration of metal sulphates in waste acid stream 10 is less than the solubility limit of metal sulphates in stream 10. The metal sulphate concentration of waste acid stream 10 will vary depending upon the process from which waste acid stream 10 is obtained. The metal sulphate concentration in the waste sulphuric acid stream may vary from about 100 ppm to about 10 wt %.

In some cases, waste acid streams from industrial processes may be fairly dilute, ranging from about 1% acid to about 30% acid. Accordingly, depending upon the concentration of iron sulphate in the waste acid stream, the waste acid stream may be subjected to a preliminary concentration step (e.g. waste acid stream 12). For example, if the concentration of acid in the waste acid stream is relatively low, for example about 20% or less, then iron sulphate concentration is probably substantially below the solubility level of the iron sulphate in this dilute stream and the dilute waste acid stream may be concentrated until the iron sulphate is at about, and preferably, slightly below, its solubility limit in the waste acid stream.

If the waste acid stream is relatively dilute, then the waste sulphuric acid stream is preferably subjected to a pre-concentration step to produce a concentrated waste acid stream. The concentrated waste acid stream may then be fed to the ion exchange step. The waste acid stream is preferably concentrated so that the acid concentration in the concentrated stream is less than about 50 wt %. Typical ion exchange resins can tolerate acid strengths up to about 50 wt % without rapid degradation. The waste acid stream is also preferably concentrated so that the concentration of metal sulphates in the concentrated stream is sufficiently low so that the sulphates will not precipitate out in the ion exchanger or any equipment upstream therefrom. However, if any iron sulphate precipitates out in the equipment, the precipitate will be the monohydrate, which will not adhere to the surfaces of the equipment, and not the heptahydrate which will foul the equipment.

Stream 10 may be fed to filter 20 to remove solid particulate matter contained in the stream. The filtered waste acid stream, namely stream 22, is fed to holding tank 24.

Figure 2:
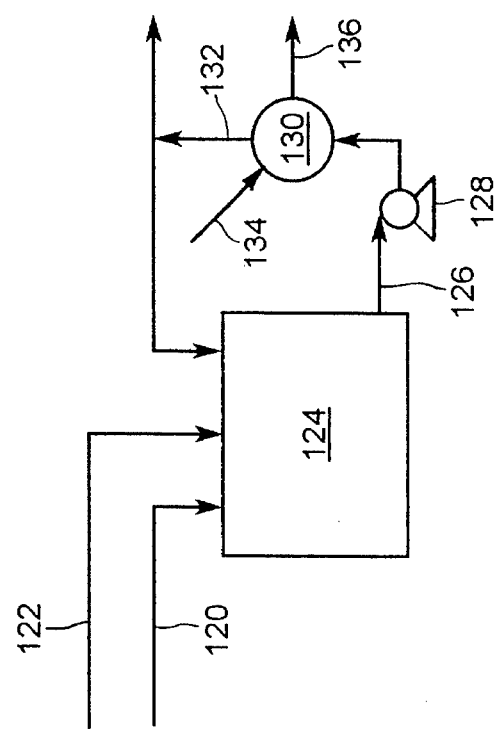
FIG. 2 is a schematic view of an optional concentration step for the product of FIG. 1; and, FIG. 3 is a schematic view of a further optional concentration step of the product of FIG. 1.

Referring to FIG. 2, dilute waste acid stream 12 may be concentrated by feeding stream 12 to evaporator 30. Evaporator 30 may be a single or a multi-stage evaporation unit. Evaporator 30 produces water stream 32 and pre-concentrated waste acid stream 34 having an acid concentration, for example, form about 35 to about 45%. Stream 34 may be fed to filter 20 and subsequently to holding tank 24. Several different waste acid streams of differing concentrations may be fed to the process shown in FIG. 1. Each of these may be fed to evaporator 30 and/or filter 20 before being sent to holding tank 24.

Acid stream 42 from holding tank 24 is fed to ion exchanger 40. Feed water 44 is also fed to ion exchanger 40. Acid stream 42 and water stream 44 are passed through an ion exchange bed contained in ion exchanger 40 to produce acid-rich stream 46 and salt-rich stream 48.

The ion exchange resin may be any of those know in the art for ion exchange units. Examples of such resins include those sold by Rohm and Haas under the trade mark AMBERLITE. The ion exchange resin is generally installed in a fixed bed and the liquid to be treated flows through the fixed bed.

In the embodiment shown in FIG. 1, the ion exchange resin is installed in a fixed bed. As the acid stream passes through the ion exchange bed, sulphuric acid is absorbed on the resin thus producing salt-rich stream 48. After the bed is reasonably saturated with the sulphuric acid, the bed may be regenerated by discontinuing the flow of the acid stream therethrough and instead passing water stream 44 therethrough. The sulphuric acid is transferred to water stream 44 creating acid-rich stream 46. Once the bed has been regenerated, the bed ready for the passage therethrough of the acid stream.

The ion exchange process is very efficient and may produce acid-rich stream 46 which is substantially a salt free stream. Acid-rich stream 46 may contain from about 0 wt. % to about 10 wt. %, and more preferably from about 0 wt. % to about 5 wt. % metal sulphates. While ion exchange will generally result in an acid-rich stream containing as little as about 15% of the metal sulphates from acid stream 42, alternate separation techniques may be used to remove the remaining metal sulphates so that stream 46 is essentially salt free. For example, chemical dosing or electro-chemical operation may be utilized to remove additional amounts of metal sulphates from stream 46 (not shown).

Salt-rich stream 48 is essentially free of acid. Salt-rich stream 48 may contain from about 0 wt. % to about 10 wt. % sulphuric acid, and more preferably from about 0 wt. % to about 15 wt. % sulphuric acid. Salt-rich stream 48 may be treated to obtain an iron sulphate stream for water treatment.

The process is very flexible and may be adjusted to produce a variety of acid-rich streams having differing acid and dissolved salts (sulphates) concentrations. If the process is used in a titanium pigment operation, then it may be desired to reuse the product acid in the leaching operation. Accordingly, the strength of the product acid and its dissolved and suspended solids content is not very critical. Alternately, the product acid may be used as a diluent for further acid manufacture. In such a case, the product acid preferably has a dissolved salts concentration less than about 50 ppm and an acid concentration greater than about 50 %.

Acid-rich stream 46 may be sent to holding tank 50 from where it may be fed to a concentration step. During the concentration step, water is removed from the acid-rich stream to produce a concentrated acid stream. The acid stream may be concentrated to any desired level. Preferably, the acid is concentrated to at least 60% acid. By using single stage or multi-stage evaporation, acid-rich stream 46 may be concentrated to contain from about 60 to about 80% acid. The exact concentration achieved will depend in part upon the use which is to be made of the concentrated sulphuric acid stream.

Referring to FIG. 1, a multi-step evaporation unit is exemplified. Pursuant to this embodiment, acid-rich stream 52 is preheated by passing the stream through indirect heat exchanger 54 to produce heated acid stream 56. The heated stream is then passed to a first effect evaporator 60. This evaporator may operate under vacuum and relatively low temperatures, such as about 50 mm Hg and 65° C. The evaporator produces a vapour stream 64 and a concentrated acid stream 66. Vapour stream 64 is fed to a direct contact barometric condenser 68. Cold water stream 70 is fed to barometric condenser 68. The contact between cold water stream 70 and vapour stream 64 results in the production of warm water stream 72. In addition, the condensation of vapour stream 64 produces the vacuum for first effect evaporator 60.

A portion of concentrated acid stream 66 is fed to indirect heat exchanger 74. As is described below, vapour from second effect evaporator 86 is fed to heat exchanger 74, heating the portion of concentrated acid stream 66 which is recycled to the first effect evaporator via stream 62. The remaining portion of concentrated acid stream 66 is fed to pump 76 and subsequently to indirect heat exchanger 78 to produce heated concentrated acid stream 80. Stream 66 may be heated in heat exchanger 78 such as by indirect contact with steam 82 thus producing water stream 84.

Heated concentrated acid stream 80 is fed to second effect evaporator 86 to produce vapour stream 90 and acid stream 92. Second effect evaporator 86 may be operated at conditions which are similar to or different from those in first effect evaporator 60. For example, second effect evaporator 86 may be operated at a higher temperature than first effect evaporator 60, such as at about 140° C., and at a higher pressure, such as at about atmospheric pressure.

Second effect evaporator 86 may be heated by passing a portion of acid stream 92 through indirect heat exchanger 94 to produce heated acid stream 96 which is fed to second effect evaporator 86. Stream 92 is heated by indirect contact with steam 98 in heat exchanger 94 thus producing water 100.

Acid stream 92 may be further concentrated by feeding this stream to a flash cooler 102 to produce vapour stream 104 and acid stream 106. The flash cooler is operated at reduced pressure, such as at about 40 mm Hg, thus resulting in a significant water vaporization rate and a corresponding rise in the acid concentration in stream 106.

As discussed above, vapour stream 90 is fed to heat exchanger 74 where it is condensed to produce stream 108.

Acid stream 106 is fed to tank 110. Pump 112 is used to feed hot recycle stream 114 to heat exchanger 54. The passage of hot recycle stream 114 through indirect heat exchanger 54 results in heat being transferred from the recycle stream to acid-rich stream 52. Cool recycle stream 116 exits heat exchanger 54. Stream 116 may be used as feed material to the process from which 10 and/or 12 are obtained. If stream 116 is used as a recycle stream to the process, then the degree of concentration achieved via the multi-stage evaporation step is designed so as to produce stream 116 having the appropriate concentration of acid.

In an alternate embodiment, make-up acid 118 may be fed to tank 110 and mixed with acid stream 106. Make-up acid stream 118 may be a strong acid, such as 93% or stronger. Accordingly, by adding make-up acid and/or altering the number and efficiency of the evaporation units, varying degrees of concentration of stream 116 may be obtained. For example, the concentration of stream 116 may vary from about 75% to about 85% and preferably, from about 60% to about 80%.

In an alternate embodiment, sulphur trioxide may be added to obtain a final product having a stronger concentration. Referring to FIG. 2, acid produced in the process from FIG. 1 is fed by a stream 120 to tank 124. Stream 120 may be obtained from acid streams 92, 106, 114 or 116. Stream 120 may have a strength from about 60% to about 80%. Oleum is added via stream 122. After being mixed in tank 124, acid stream 126 is fed to pump 128 and subsequently to heat exchanger 130 to produce cooled, concentrated acid stream 132. Acid stream 126 is cooled in heat exchanger 130 by indirect contact with cold water stream 134 which is heated to produce stream 136. Cooled acid stream 132 may contain from about 80% to about 95% acid and, more preferably up to about 95% acid. Cooled acid stream 132 may be fed back to tank 124 or, alternately may be recycled to the process or stored for subsequent sale or use.

Figure 3:
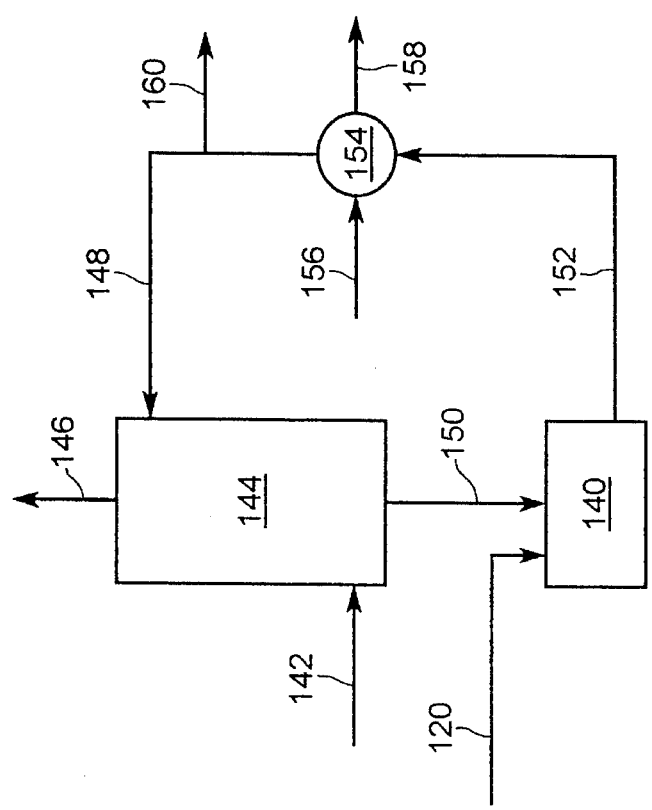

An alternate process for the addition of sulphur trioxide to acid stream 120 is shown in FIG. 3. As shown in this figure, acid stream 120 is fed to tank 140. Sulphur trioxide is fed via stream 142 to packed tower 144. The sulphur trioxide travels upwardly through packed tower 144 to produce gas stream 146. Acid stream 148 is fed to the top of tower 144 and contacts the sulphur trioxide as it passes downwardly tower 144. Stream 150 is withdrawn from the bottom of packed tower 144 and fed to tank 140. Acid stream 152 is withdrawn from tank 140 and fed to indirect heat exchanger 154. Cold water 156 is also fed to heat exchanger 154. During the passage of the streams through the heat exchanger, heat is transferred from acid stream 152 to cold water stream 156 thus producing stream 158 containing heated water and cooled acid stream 148 which is fed into tower 144. Product acid may be removed from stream 148 via stream 160. As discussed above with respect to FIG. 2, by utilizing this process, a stream with concentrated sulphuric acid, having a concentration for example of about 98% may be obtained.

I claim:

1. In a process for concentrating a waste sulphuric acid stream from a plant, said stream containing metal sulphates including iron sulphate, the concentration of said sulphates in said waste sulphuric acid stream being less than the solubility limit of said sulphates, the steps of:

(i) subjecting said stream to an ion exchange operation to produce an acid-rich stream and a salt-rich stream, said operation being conducted to produce an acid-rich stream having an acid concentration above the concentration at which iron sulphate precipitates out as iron sulphate heptahydrate; and, (ii) concentrating said acid-rich stream to produce a concentrated sulphuric acid-rich stream whereby, during said steps, iron sulphate which precipitates out is in its monohydrate form.

2. The process as claimed in claim 1 wherein the concentration of sulphuric acid in said waste sulphuric acid stream is up to about 50 wt. %.

3. The process as claimed in claim 1 wherein the concentration of sulphuric acid in waste sulphuric acid said stream is from about 5 wt. % to about 45 wt. %.

4. The process as claimed in claim 1 further comprising the step of subjecting said waste stream to a pre-concentration step to produce a concentrated waste stream.

5. The process as claimed in claim 4 wherein said the concentration of said sulphates in said concentrated waste stream is less than the solubility limit of said sulphates in said concentrated waste stream.

6. The process as claimed in claim 5 wherein the concentration of sulphuric acid in said concentrated sulphuric acid waste stream is up to about 50 wt. %.

7. The process as claimed in claim 6 wherein the concentration of sulphuric acid in said concentrated sulphuric acid waste stream is from about 35 wt. % to about 45 wt. %.

8. The process as claimed in claim 1 wherein the concentration of acid in said concentrated acid-rich stream is greater than about 60 wt. %.

9. The process as claimed in claim 8 wherein the concentration of acid in said concentrated acid-rich stream is from about 60 to about 80 wt. %.

10. The process as claimed in claim 8 wherein concentration step (ii) comprises evaporating water from said acid-rich stream to produce said concentrated acid-rich stream.

11. The process as claimed in claim 8 wherein said acid-rich stream is concentrated by subjecting said stream to multi-stage evaporation.

12. The process as claimed in claim 8 wherein precipitated sulphates are removed from said concentrated acid-rich stream.

13. The process as claimed in claim 8 wherein said concentrated acid-rich stream is recycled to said plant.

14. The process as claimed in claim 8 wherein said concentrated acid-rich stream is contacted with a fortifying agent selected from the group consisting of a sulphuric acid solution having a concentration greater than the concentration of said acid-rich stream, oleum, sulphur trioxide and mixtures thereof to produce a fortified acid stream.

15. The process as claimed in claim 14 wherein the concentration of sulphuric acid in said fortified acid stream is greater than about 90 wt. %.

16. The process as claimed in claim 14 wherein said fortified acid stream has an acid concentration from about 90 wt. % to about 98 wt. %.

17. A process comprising the steps of:

(iii) providing a waste sulphuric acid stream containing metal sulphates including iron sulphate, said waste acid stream having a concentration of sulphates therein less than the solubility limit of said sulphates in said stream;

(iv) subjecting said stream to an ion exchange operation to produce an acid-rich stream having a sulphuric acid concentration greater than about 50 wt. % and a salt-rich stream; and, (v) concentrating said acid-rich stream to produce a concentrated sulphuric acid-rich stream whereby, during said steps, iron sulphate which precipitates out is in its monohydrate form.

18. The process as claimed in claim 17 wherein concentration step (v) comprises evaporating water from said acid-rich stream to produce said concentrated acid-rich stream.

19. The process as claimed in claim 17 wherein said acid-rich stream is concentrated by subjecting said stream to multi-stage evaporation.

20. The process as claimed in claim 19 further comprising the step of subjecting said concentrated acid-rich stream to flash cooling to produce a dirty acid stream.

21. The process as claimed in claim 20 further comprising the step of adding sulphur trioxide to said dirty acid stream.

* * * * *